United States Patent [19]

Navaux

[11] Patent Number: 5,223,061
[45] Date of Patent: Jun. 29, 1993

[54] BELT STRUCTURE FOR A RADIAL PNEUMATIC TIRE, INCLUDING SPIRALLY WOUND STRIPS REINFORCED BY CORDS COMPRISING ARAMID YARNS

[75] Inventor: Stanley Navaux, Bastogne, Belgium

[73] Assignee: The Goodyear Tire & Rubber Company, Akron, Ohio

[21] Appl. No.: 590,999

[22] Filed: Oct. 1, 1990

[51] Int. Cl.$^5$ ............ B60C 9/02; B60C 9/18; B60C 9/26
[52] U.S. Cl. .................... 152/527; 152/529; 152/531; 152/533; 152/536; 152/556; 428/295
[58] Field of Search ........... 152/526, 531, 532, 533, 152/528, 529, 536, 527, 556, 534; 156/117; 428/295

[56] References Cited

U.S. PATENT DOCUMENTS

| | | | |
|---|---|---|---|
| 2,235,082 | 3/1941 | Parker | 152/451 |
| 2,273,200 | 2/1942 | Hoff | 152/451 |
| 3,386,487 | 6/1968 | Massoubre | 152/526 |
| 3,473,594 | 10/1969 | Mirtain | 152/538 |
| 3,628,587 | 12/1971 | O'Neil et al. | 152/536 X |
| 3,656,533 | 4/1972 | Barassi et al. | 152/534 X |
| 3,678,982 | 7/1972 | Watanabe et al. | 152/534 |
| 3,842,884 | 10/1974 | Bertrand | 152/531 |
| 4,155,394 | 5/1979 | Shepherd et al. | 152/527 |
| 4,172,487 | 10/1979 | Suzuki et al. | 152/534 X |
| 4,284,117 | 8/1981 | Poque et al. | 152/527 |
| 4,745,955 | 5/1988 | Morikawa et al. | 152/527 |
| 4,832,102 | 5/1989 | Domchick | 152/527 |
| 4,850,412 | 7/1989 | Gupta | 152/556 |
| 4,877,073 | 10/1989 | Thise et al. | 152/531 |
| 4,890,659 | 1/1990 | Harakon et al. | 152/531 |
| 4,893,665 | 1/1990 | Reuter et al. | 152/527 X |
| 4,949,770 | 8/1990 | Polvara et al. | 152/531 |
| 4,957,799 | 9/1990 | Miyamoto et al. | 152/536 X |
| 4,966,214 | 10/1990 | Kadota | 152/528 |
| 4,989,658 | 2/1991 | Maathuis et al. | 152/533 |
| 5,036,896 | 8/1991 | Welter et al. | 152/528 X |
| 5,176,769 | 1/1993 | Kadota et al. | 152/526 X |

FOREIGN PATENT DOCUMENTS 1487426  9/1977  United Kingdom ............. 152/531

OTHER PUBLICATIONS

"Polyamide Monofilament", Research Disclosure Apr. 1989, Dupont, #30076.

*Primary Examiner*—Michael W. Ball
*Assistant Examiner*—Adrienne C. Johnstone
*Attorney, Agent, or Firm*—David E. Wheeler

[57] ABSTRACT

A radial ply pneumatic tire (10) has carcass plies (13–15) reinforced by textile cords and folded axially around a pair of axially spaced bead cores (11,12) and a belt structure (30; 330) comprising at least two layers (32–34; 332–334) made of spirally wound strips. The spirally wound strips are reinforced by cords consisting at least in part of aramid yarns. Between each pair of neighboring layers (332–334) of spirally wound strips, a ply (340,341) reinforced by textile cords is interposed. Such a belt structure is more specifically suitable for an aircraft tire.

14 Claims, 3 Drawing Sheets

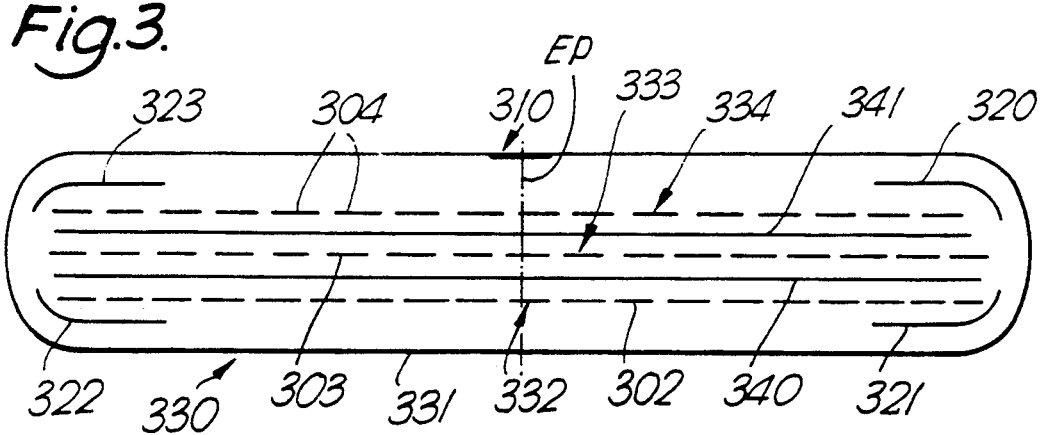
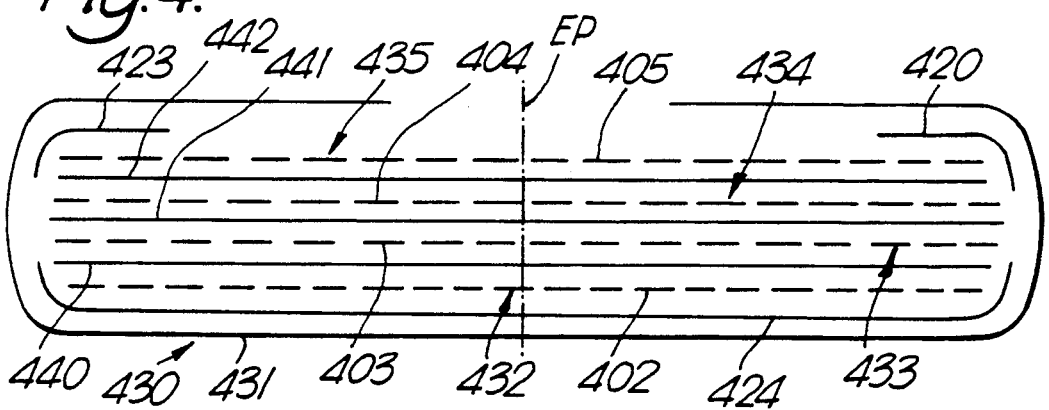
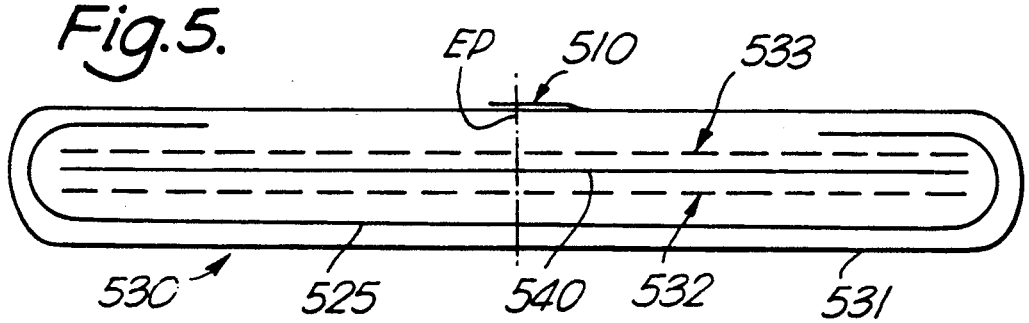

BELT STRUCTURE FOR A RADIAL PNEUMATIC TIRE, INCLUDING SPIRALLY WOUND STRIPS REINFORCED BY CORDS COMPRISING ARAMID YARNS

BACKGROUND OF THE INVENTION

The present invention relates to a belt structure for a pneumatic radial tire and more specifically for a tire suitable for use on aircraft.

It is generally recognized in the tire art that tires suitable for use on aircraft must be capable of operating under conditions of very high speeds and large loads as compared to tires used on automobiles, busses, trucks or similar earthbound vehicles. It is understood, however, that tires for such earthbound vehicles may advantageously be made in accordance with the broad aspects of the invention described herein. As used herein and in the claims, a tire is "suitable for use on an aircraft" if the tire is of a size and load range, or ply rating, specified in either the *YEARBOOK OF THE TIRE AND RIM ASSOCIATION,* or the *YEARBOOK OF THE EUROPEAN TIRE AND RIM TECHNICAL ORGANIZATION,* for the year in which the tire is manufactured, or in the current U.S.A. military specification "MIL-T-5041".

It is known in the tire art that a radial tire having a folded belt ply in its belt structure, shows good high speed properties. In order to enhance the high speed properties of a tire, such belt plies are usually folded around a plurality of unfolded belt plies. The folded belt ply effectively reduces the potential for destruction of the belt which can be caused by a separation of the unfolded belt ends from the surrounding rubber.

Finite element analysis shows that if the reinforcing cords of these unfolded belt plies are parallel to the equatorial plane of the tire, a minimum shear stress between the different plies is obtained. Such an orientation of the reinforcing cords is also obtained by replacing the unfolded layers by spirally wound strips. Layers of spirally wound strips lead in addition to a relatively high belt strength for a relatively low number of belt plies.

It is further known that in view of its high modulus and dimensional stability, aramid is particularly advantageous as reinforcing element in high speed tires. As used herein, "aramid" and "aromatic polyamide" are both understood to mean a manufactured fiber in which the fiber forming substance is generally recognized as a long chain synthetic aromatic polyamide in which at least 85% of the amide linkages are attached directly to the two aromatic rings. Representative of an aramid or aromatic polyamide is a poly (p-phenyleneterephtalamide). It is to be noted that aramid has up to now been mostly disregarded as reinforcement of the belt plies when the reinforcing cords make an angle less than 10° to the equatorial plane of the tire; this is due to the fact that aramid lacks the expansion properties required in the shaping and vulcanizing step of the tire.

It is an object of the present invention to provide a belt for a radial tire particularly suitable for use on aircraft and having excellent dimensional stability, a good tread life as well as outstanding high-speed properties.

It is a further object of the present invention to create a tire belt comprising reinforcing cords consisting at least in part of aramid.

SUMMARY OF THE INVENTION

There is provided in accordance with a first aspect of the present invention, a circumferential direction of the belt structure, comprising:

(a) at least two layers made of spirally wound strips, oriented at about 0° to 5° with respect to the equatorial plane of the tire and extending substantially about the axial width of the belt structure, the spirally wound strips being reinforced by cords comprising aramid yarns; and (b) a ply interposed between each pair of neighboring layers of spirally wound strips, extending over substantially the same width as said layers between which each said ply is interposed, each said ply being reinforced with textile cords.

There is provided in accordance with another aspect of the present invention, a pneumatic tire having a pair of substantially inextensible annular bead cores which are axially spaced apart with at least two carcass plies extending between the bead cores, each of the carcass plies comprising a plurality of reinforcement cords oriented at 75° to 90° with respect to the equatorial plane of the tire and at least one belt structure comprising (a) at least two layers made of spirally wound strips, oriented at 0° to 5° with respect to the equatorial plane of the tire and extending substantially about the axial width of the belt structure, the spirally wound strips being reinforced by cords comprising aramid yarns; and (b) a ply interposed between each pair of neighboring layers of spirally wound strips, extending over substantially the same width as said layers between which each said ply is interposed, each said ply being reinforced with textile cords.

To acquaint persons skilled in the art with the principles of the invention, certain presently preferred embodiments illustrative of the best mode now contemplated for the practice of the invention are described herein, making reference to the attached drawings forming part of the specification.

BRIEF DESCRIPTION OF THE DRAWINGS

FIG. 3 is an enlarged cross-sectional view of a belt structure according to a first embodiment of the invention; and FIGS. 4 to 7 are enlarged cross-sectional views of alternate embodiments of belts according to the invention.

DETAILED DESCRIPTION OF THE INVENTION

Figure 1:
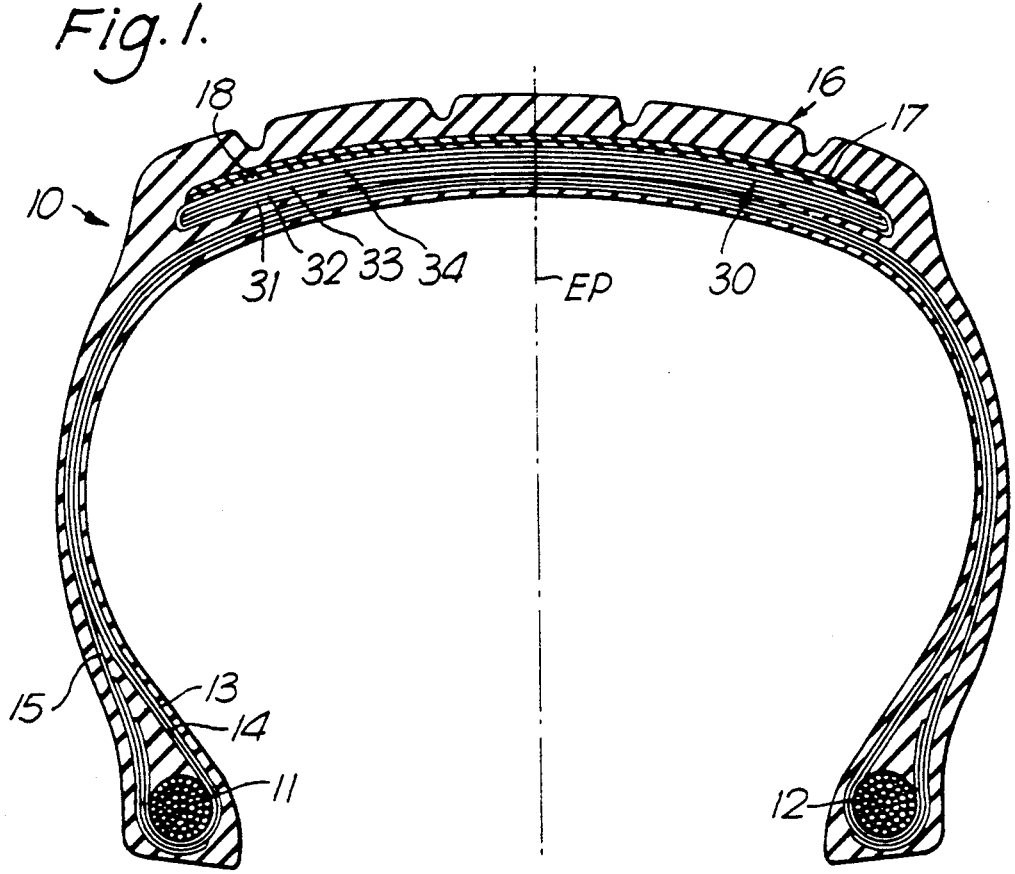
FIG. 1 is a cross-sectional view of a radial aircraft tire, taken in a plane that contains the axis of rotation of the tire.

With reference to FIG. 1, an aircraft tire 10 of size 25.5×8.0 R 14 is illustrated which has a pair of substantially inextensible annular bead cores 11,12 which are axially spaced apart with carcass plies 13,14,15 extending between the bead cores. As used herein and in the claims, the terms "axial" and "axially" refer to directions which are parallel to the axis of rotation of a tire, the terms "lateral" and "laterally" are understood to refer to directions going from one sidewall of a tire towards the other sidewall of a tire, and the terms "radial" and "radially" refer to directions that are radially toward or away from to the axis of rotation of a tire.

Each of the carcass plies 13,14,15 comprises a plurality of reinforcing cords oriented at 75° to 90°, preferably 80° to 89°, with respect to an equatorial plane (EP) of the tire. The "equatorial plane" of a tire is a plane that is perpendicular to the axis of rotation of the tire and passes through the center of the tire tread. "Tread" means that portion of the tire that comes into contact with the road when the tire is inflated to its nominal pressure and subjected to its rated load.

The carcass comprises two turn-up carcass plies 13,14 and one turn-down carcass ply 15. Each of the turn-up carcass plies 13,14 is folded radially and axially outwardly about each of the bead cores 11,12 and the turn-down carcass ply 15 is folded at least partially radially and axially inwardly about each of the bead cores 11,12 and the turn-up carcass plies 13,14.

It is preferred that the orientation of the reinforcing cords in each carcass ply, or pair of carcass plies, is nearer to 90° with respect to the equatorial plane than the orientation of the reinforcing cords of the radially next innermost ply, or pair of carcass plies, and the included angles between the angles of radially adjacent carcass plies should not be greater than 10°, and preferably not greater than 4°. For example, the outermost ply may be 90°, the adjacent ply may be 84°, and the innermost ply may be 74°. For details about the choice of ply angles, reference is hereby made to commonly owned U.S. Pat. No. 4,832,103.

In the illustrated embodiment, the reinforcing cords of all of the carcass plies 13,14,15 can be substantially the same and each comprise a monofilament of 3000 or 4,000 denier nylon. A monofilament is by definition a cord consisting of one filament. The monofilaments can have any cross-section, an oval or flattened cross-section is however preferred. The monofilaments in each carcass ply are preferably disposed with a minimum density of 16 EPI (ends per inch) in order to yield the desired mechanical characteristics of the tire carcass. Further details about a tire carcass including nylon monofilaments can be found in commonly owned patent application Ser. No. 345,925 filed on May 1, 1989.

It is understood that the particular carcass structure illustrated in FIG. 1 and described herein is merely an example used in a possible embodiment of the invention and that a tire designer may employ any number of carcass plies or any reinforcement cords for the carcass plies in accordance with the performance requirements of a particular tire while still practicing the present invention.

The belt structure 30 comprises a belt ply 31 folded around three layers 32-34 formed by the convolutions of textile reinforced spirally wound rubber strips, disposed radially outwardly of the carcass plies 13,14,15 in the crown region of the tire 10. Put another way, each layer 32-34 is comprised of a continuous ribbon-like material, having a width of at least a few mm, preferably of about 15 mm, spirally wound in a plurality of circumferential turns on the tire carcass, in a region underlying the tread. The neighboring turns belonging to the same layer can either have an overlapping or abutting relationship, or be spaced, tailoring thereby the reinforcement potential and versatility of the layers made of the spirally wound strips to the reinforcement needs of the different parts of the crown area; the spirals in the shoulders of the tire, submitted to important stresses at high speed, can have for instance an overlapping relationship whereas the spirals in the center of the tire can be spaced by a few mm.

The folded belt ply 31 is reinforced with parallel cords oriented at 12° to 20° with respect to the equatorial plane EP of the tire. Each cord is comprised of two or more yarns that have been twisted together. A yarn is constructed of filaments, i.e. fibers of an indefinite or extreme length of the same base material.

A cord suitable to implement the invention comprises at least two yarns each of which consists only of aramid filaments and a single core yarn which consists only of filaments selected from the group consisting of polyamides having a structure which is at least partly oriented and polyesters having a structure which is at least partly oriented. The aramid yarns are adjacent to one another and twisted about the core yarn to manufacture the composite cord, but the aramid yarns are not twisted about one another. In a preferred embodiment the core yarn consists of at least one filament of at least partly oriented nylon. The composite cord has a twist multiplier in the range of 5 to 12 and a ratio of twist in the aramid yarns to the twist in the cable in the range of 1.0 to 2.0. The twist multiplier (TM) is determined according to the following equation:

$$TM = 0.0137 \times CT \times \sqrt{CD}$$

wherein
CT is the number of turns per inch (2,54 cm) of cord length; and
CD is the sum of the deniers of the yarns and/or subgroups of the yarns of the cord before any twist is imparted to the yarns or subgroup.

For further details about such composite aramid cords reference is made to commonly owned U.S. Pat. No. 4,893,665.

The parallel composite cords can have a linear density of 3,000/3+840 denier, comprising three aramid yarns, each yarn having a linear density of 3,000 denier before any twist is imparted thereto and one nylon core yarn having a linear density of 840 denier. The denier of the non-aramid core yarn should preferably be in the range of 5% to 30% of the sum of the deniers of all the aramid yarns. The composite cords have a fabric density of 15 EPI. The spirally wound strips are oriented at 0°-5° with respect to the equatorial plane EP, and extend transversely across substantially the entire axial width delimited by the folded ply 31.

In another embodiment of the invention, the spirally wound strips are reinforced by cords of aramid having a twist multiplier of at least 6 and preferably in the range of 7 to 12 and wherein the yarns comprised in the cords have a twist of at least 10 turns per inch and preferably in the range of 12 to 20 turns per inch. Further details of so-called high twist aramid cords can be found in commonly owned U.S. patent application Ser. No. 391,822 filed on Aug. 10, 1989. Spiral strips having reinforcing cords comprising aramid yarns, the aramid yarns having together a linear density of at least 5000D, a fabric density of the reinforcing cords of at least 12 EPI can be used. In a folded ply (see FIG. 5), cords comprising aramid yarns, the aramid yarns having together a linear density of at least 4000D, and a fabric density of the cords of at least 10 EPI, can be used.

The high twist aramid cords in a preferred embodiment have a linear density of 3,000/3 denier and have a fabric density of 20 EPI.

In still another embodiment of the invention, the spirally wound strips are reinforced by cords comprising at least two yarns of aramid filaments twisted together with at least one yarn of oriented nylon or polyester. The aramid and the nylon or polyester yarns have different twists. Such cords are described in U.S. Pat. No. 4,155,394, the content of which is included herein by reference.

A preferred cord has two yarns of 3,000 denier aramid at a twist of 6.7 turns per inch in a first direction and one yarn of 1890 denier nylon at a twist of 4.5 turns per inch in the first direction, the three yarns being twisted together into a cord at 6.7 turns per inch, in a second direction opposite to the yarn twist direction. The fabric density is 16 EPI.

Between the ground engaging tread portion 16 and the belt structure 30 are disposed two overlay plies 17,18 reinforced by 840/2 denier nylon cords. The nylon cords have a fabric density of 22 EPI and are parallel to each other in each ply. They are oriented at about 20° for one of the plies and −20° for the other ply with respect to the equatorial plane EP of the tire. It is believed that the overlay plies 17,18 only make a minor contribution to the properties and high-speed performance of the tire; their main function is to protect the belt during retreading operations where they act as a warning layer when the elastomeric material constituting the tire tread is buffed away.

Figure 2:
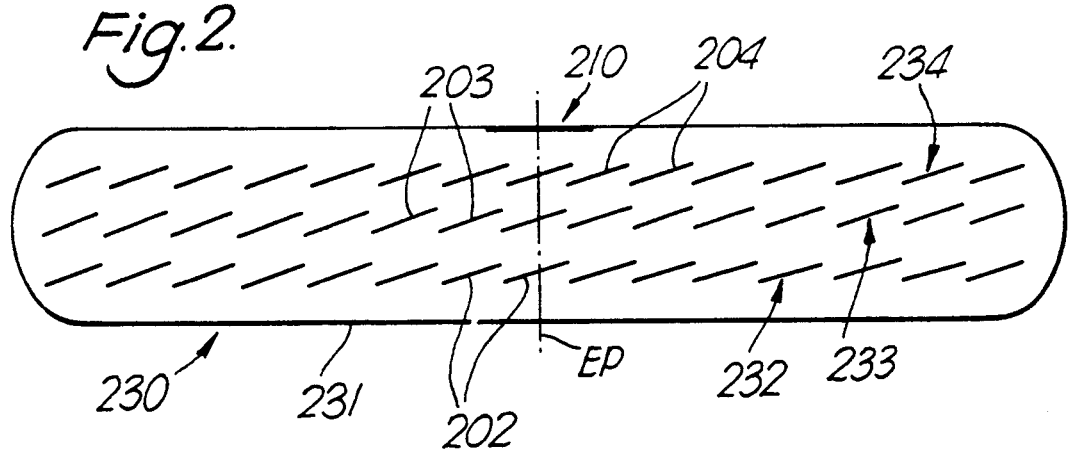
FIG. 2 is an enlarged cross-sectional view of a belt structure according to the prior art.

The prior art belt can best be described by reference to FIG. 2, which is an enlarged view of a belt 230 having one belt ply 231 folded around three layers 232,233,234 of spirally wound strips 202,203,204. The lateral ends of the folded belt ply 231 have an overlapping relationship at splice 210. Such an overlap helps towards preventing a tire failure, which could occur on the centermost part of the tread, when the tire is subjected to high speed.

Figure 6:
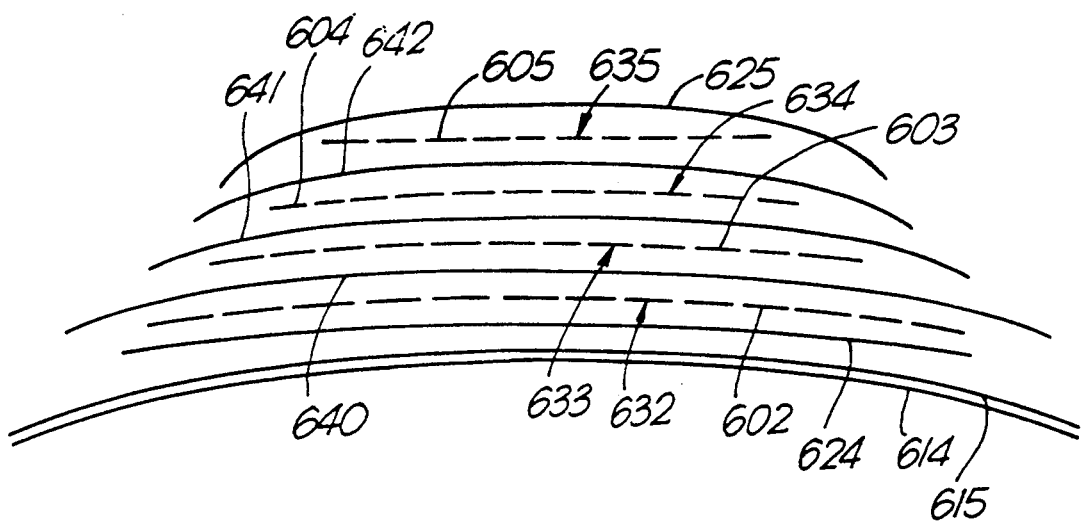
Figure 7:
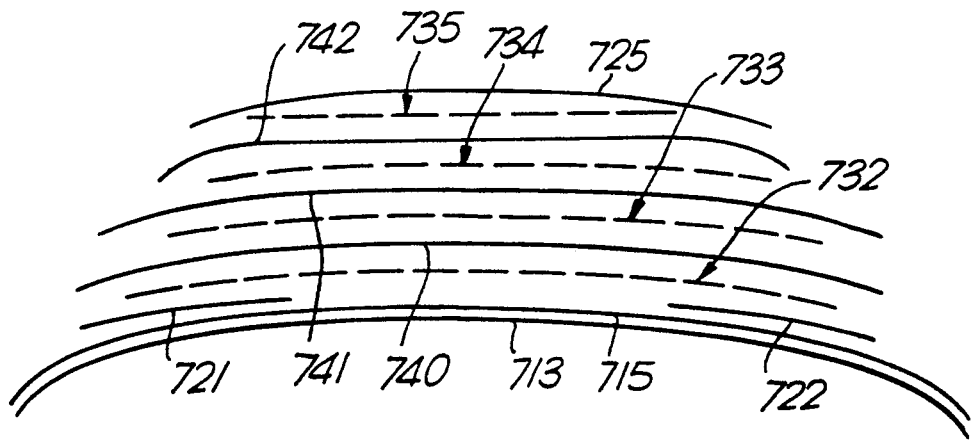

It is to be understood that the drawings of FIG. 2 to FIG. 5, supposed to show cured belts are schematic and serve only an explanatory purpose; in reality, once a tire has been built on the forming drum, the belt shows a curvature following substantially the curvature of the carcass plies as shown on FIG. 6 and 7.

The convolution of the strips 202,203,204, which can have a width ranging between 5 mm to 30 mm and by preference a width of about 15 mm, are wound in the tire building process so as to have an abutting relationship in each of the layers 232,233,234. They make an angle of 0°-5° with the equatorial plane EP of the tire; in an axial cross-section, the spirals of each belt layer define a line.

During the shaping and vulcanizing process of the tire, each spiral tends to move in the belt so as to maintain its length given to it in the tire building process. This is due to the low elongation potential of the aramid reinforcement cords which are continuous and parallel to one another in the spiral strip. The radially outer spirals 203,204 thereby displace the neighboring radially inner spirals (203,204 respectively) towards the axis of rotation of the tire.

After the shaping and vulcanizing process, the spirals composing one layer no longer define a layer with a linear cross-section, but the lateral ends of neighboring spirals belonging to the same layer are radially offset. Such a disposition of the spirals in the same layer is detrimental to the stress distribution in the belt and diminishes the high speed performance of the tire as well as its uniformity.

Referring now to FIG. 3, there is shown a belt 330 made according to the invention. A ply 340,341 reinforced with 840/2 denier nylon cords is interposed between each of the layers 332,333,334. The nylon cords have a density of 22 EPI and are oriented at an angle comprised between 5° and 24° with the equatorial plane EP. The nylon reinforced plies 340,341 have substantially the same width as the layers 332,333,334. It is believed that their contribution to the strength properties of the belt in the tire is low; their main function is to maintain the relative position of the spiral convolutions 302,303,304 during the shaping and vulcanizing process in order to have the spirals of each layer define a line in an axial cross-section. Such a line is however, as suggested by FIG. 3, not a straight line but, as explained above, a line following substantially the curvature of the carcass plies.

The linear density of the nylon cords as well as the fabric density of the cords required in the plies 340,341, depends of course on the linear density of the aramid cords and on their fabric density in the spiral strip. For instance 840/1 denier nylon cords having a fabric density of 30 to 40 EPI, preferably 36 EPI in the ply, are required to maintain a proper disposition of the spirals in the belt when the spirals are reinforced with 3,000/3 denier aramid having a fabric density of 15 EPI.

Between the lateral edges of the respective radially innermost as well as outermost belt layers 332,334 and the folded belt ply, so-called BENS, i.e. breaker edge nylon strips are disposed. They are usually reinforced by 840/2 denier nylon cords having a fabric density of 22 EPI. The nylon cords can form an angle comprised between 5° and 40° with a plane parallel to the equatorial plane EP of the tire and intersecting the cords. The main function of such strips is to reinforce the fold and to work as a transient layer between the folded layer and the unfolded layers.

Referring now to FIG. 4, there is shown an alternate embodiment of the invention featuring four belt layers 432,433,434,435 of spirally wound strips 402,403,404,405, each belt layer 432,433,434,435 extending over the full axial width, delimited by the folded belt ply 431. Plies 440,441, 442 reinforced with nylon cords are interposed between each couple of neighboring aramid reinforced spirally wound layers 432,433,434,435. The main difference with the belt 330 shown innermost FIG. 3 is that the two radially in BENS (references 321,322) have been replaced by a continuous nylon ply 424 extending over the whole axial width of the belt 430 and folded around the lateral edges of at least one of the radially innermost belt layers 432. The ply 424 is reinforced by 840/1 denier nylon cords having a density of 36 EPI. The nylon cords form an angle ranging between 5° and 25°, and by preference about 10° with respect to the equatorial plane EP of the tire.

The loss of strength resulting from the fact that the folded belt ply 431 has no overlapping lateral ends is partly compensated in the represented embodiment by the extra strength due to the fourth layer 435 of spirally wound strips.

In the belt structure 530 shown in FIG. 5, the BENS 320,321, 322,323 shown in FIG. 3, or the combination of BENS 420,423 and a ply 424 shown in FIG. 4, have been replaced by a continuous nylon reinforced ply 525, folded around the different belt layers 532,533 of spirally wound strips. Such an arrangement is an advantage from a manufacturing point of view since the folded aramid reinforced belt ply 531 and the nylon reinforced ply 525 can enter the tire building process as a combined ply and subsequently be folded jointly around the spirally wound belt layers 532,533.

Referring now to FIG. 6, there is shown an alternate embodiment of the invention featuring four belt layers 632,633,634,635 comprising spirally wound strips 602,603,604,605 located in the crown region of the tire. Plies 640,641,642 reinforced with nylon cords are interposed respectively between neighboring aramid reinforced layers 632,633,634,635. Another ply 624, reinforced with nylon cords is located between the radially innermost belt layer 632 comprising spirally wound strip 602 and the radially outermost carcass ply 615, and a further ply 625 is located between the radially outermost belt layer 635 comprising spirally wound strip 605 and the overlay plies (not shown) which protect the belt during retreading operations. The main function of the plies 624,625 is to protect the end of the aramid cords against discutangling. The nylon reinforced plies 640,641,642 can have different widths; each radially outer ply can for instance have an 5%-10% smaller width than the neighboring radially inner ply. The width of the ply 624 adjacent to the carcass ply, must be at least equal to the width of the radially innermost belt layer 632, which comprises the spirally wound strip 602. The different plies 624,625,640,641,642 are reinforced by 840/1 denier nylon cords having a fabric density of 36 EPI or by 840/2 denier nylon cords having a fabric density of 24 EPI. The nylon cords form an angle ranging between 5° and 25° and by preference form an angle of about 10° with the equatorial plane EP of the tire.

In FIG. 7 there is shown still an alternate embodiment of the invention, featuring four belt layers of spirally wound strips. The main difference from the belt structure shown in FIG. 6 is that there is no single radially innermost nylon reinforced ply 624, adjacent to the carcass plies 713,715, but instead the embodiment comprises a split ply 721,722 protecting the ends of the reinforcement cords of the radially innermost layer 732 of spirally wound strip. Structural features equivalent to those shown on FIG. 6, are identified by the same reference number increased by 100.

Spirally wound, aramid reinforced strips in the belt contribute to provide tires which possess the strength needed to resist extraordinary levels of deflection and high speed (such as is the case for aircraft tires). It is understood however, that the particular reinforcement of the plies interposed between the layers of spirally wound strips described herein, i.e. nylon cords, is merely an example used in a possible embodiment of the invention. The tire designer may choose any textile reinforcement cords having high elongation at low tension, such as polyester cords. The polyester cords should have a linear density of at least 1,000/2 denier and a fabric density of at least 20 EPI, preferably of about 30 EPI.

While certain representative embodiments have been described for the purpose of illustrating the invention, it will be apparent to those skilled in the art that various changes and modifications may be made therein without departing from the spirit or scope of the invention.

I claim:

1. An annular tire belt structure comprising,
(a) three layers made of spirally wound strips oriented at about 0° to 5° with respect to a circumferential direction of the belt structure and extending substantially across the width of the belt structure, the spirally wound strips being continuous and reinforced by parallel cords comprising aramid yarns; and
(b) a ply interposed between each pair of neighboring layers of spirally wound strips extending over substantially the same width as said layers between which each said ply is interposed, each said ply being reinforced with textile cords selected from the group consisting of nylon cords and polyester cords.

2. A belt structure as described in claim 1 wherein the layers of the spirally wound strips are reinforced with cords comprising aramid yarns, the aramid yarns having together a linear density of 5,000 denier, the fabric density of the cords being 12 EPI.

3. A belt structure as described in claim 1 wherein strips reinforced with textile cords are disposed between the lateral edges of the radially innermost layer of spirally wound strips and the carcass plies.

4. A belt structure as described in claim 1 wherein each ply interposed between each pair of neighboring layers of spirally wound strips is reinforced with nylon cords having a linear density of 840/2 denier and a fabric density of 22 EPI.

5. A belt structure as described in claim 1 wherein each ply interposed between each pair of neighboring layers of spirally wound strips is reinforced with nylon cords having a linear density of 840/1 denier and a fabric density of at least 30 EPI.

6. A belt structure as described in claim 1 wherein each ply interposed between each pair of neighboring layers of spirally wound strips is reinforced with polyester cords having a linear density of at least 1,000/2 denier and a fabric density of at least 20 EPI.

7. A belt structure as described in claim 1 wherein a plurality of the convolutions of the spirally wound strip of at least one layer has an abutting relationship.

8. A belt structure as described in claim 1 wherein a plurality of the convolutions of the spirally wound strip of at least one layer has an overlapping relationship.

9. An annular tire belt structure comprising,
(a) four layers made of spirally wound strips oriented at about 0° to 5° with respect to a circumferential direction of the belt and extending substantially across the width of the belt structure, the spirally wound strips being continuous and reinforced by parallel cords comprising aramid yarns; and
(b) a ply interposed between each pair of neighboring layers of spirally wound strips extending over substantially the same width as said layers between which each said ply is interposed, each said ply being reinforced with textile cords selected from the group consisting of nylon cords and polyester cords.

10. A pneumatic tire having a pair of substantially inextensible annular bead cores which are axially spaced apart with at least two carcass plies extending between the bead cores, each of the carcass plies comprising a plurality of reinforcement cords oriented at 75° to 90° with respect to the equatorial plane of the tire and at least one belt structure comprising
(a) three to four layers made of spirally wound strips, oriented at 0° to 5° with respect to the equatorial plane of the tire and extending substantially about the axial width of the belt structure, the spirally wound strips being reinforced by cords comprising aramid yarns; and (b) a ply interposed between each pair of neighboring layers of spirally wound strips extending over substantially the same width as said layers the ply is interposed, each said ply being reinforced with textile cords selected from the group consisting of nylon cords and polyester cords.

11. A pneumatic tire as described in claim 10 wherein the layers of the spirally wound strips are reinforced with cords comprising aramid yarns, the aramid yarns having together a linear density of 5,000 denier, the fabric density of the cords being 12 EPI.

12. The pneumatic tire of claim 10 in which the spirally wound strips comprise textile composite cords having 3 yarns each 3000 denier and a nylon cord yarn having a linear density of 5% to 30% of the sum of the deniers of the aramid yarns.

13. The pneumatic tire of claim 10 in which the spirally wound strips comprise 3 aramid yarns each 3000 denier, and a nylon core yarn of 840 denier.

14. The pneumatic tire of claim 12 in which the core yarn is 840D nylon and the end count of the composite yarns in the spirally wound strip is 15 EPI.

* * * * *